(12) United States Patent
Haga et al.

(10) Patent No.: US 7,506,114 B2
(45) Date of Patent: Mar. 17, 2009

(54) DATA TRANSFER DEVICE WHICH EXECUTES DMA TRANSFER, SEMICONDUCTOR INTEGRATED CIRCUIT DEVICE AND DATA TRANSFER METHOD

(75) Inventors: Takuya Haga, Fuchu (JP); Tetsuhiko Azuma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 554 days.

(21) Appl. No.: 11/417,636

(22) Filed: May 4, 2006

(65) Prior Publication Data

US 2006/0265534 A1 Nov. 23, 2006

(30) Foreign Application Priority Data

May 9, 2005 (JP) ............... 2005-136149

(51) Int. Cl.
*G06F 13/00* (2006.01)
*G06F 13/14* (2006.01)

(52) U.S. Cl. ............... 711/158; 711/100; 711/154; 710/243

(58) Field of Classification Search ........... 711/100, 711/154, 158, 200; 710/240–243, 244
See application file for complete search history.

(56) References Cited

U.S. PATENT DOCUMENTS

| 4,492,161 A * | 1/1985 | Johnson et al. ............. 101/109 |
| 5,708,849 A | 1/1998 | Coke et al. |
| 6,724,762 B2 | 4/2004 | Garcia et al. |
| 6,981,073 B2 * | 12/2005 | Wang et al. ............. 710/28 |
| 2004/0030849 A1 | 2/2004 | Borkenhagen et al. |
| 2005/0027902 A1 | 2/2005 | King et al. |

FOREIGN PATENT DOCUMENTS

| JP | 9-223102 | 8/1997 |
| JP | 2002-259326 | 9/2002 |

OTHER PUBLICATIONS

Office Action and translation issued in related Chinese Application No. 2006101156402 on Dec. 14, 2007, 32 pages.
Rixner, et al., "Memory Access Scheduling", Computer Architecture News, ACM, New York, NY, US, vol. 28, co.2, May 2000, 11 pages.
Corbal, et al., "Command Vector Memory Systems: High Performance at Low Cost," *Parallel Architectures and Compilation Techniques*, pp. 68-77, 1998.
Rixner et al., "Memory Access Scheduling," *Computer Architecture News*, ACM, New York, NY, US, 28(2):128-138, 2000.
European Search Report.

* cited by examiner

*Primary Examiner*—Tuan V. Thai
(74) *Attorney, Agent, or Firm*—Sprinkle IP Law Group

(57) ABSTRACT

A data transfer device which controls data transfer between a first memory device and a second memory device, includes a first transfer arbiter circuit and a second transfer arbiter circuit. The first transfer arbiter circuit outputs, in response to a transfer instruction for transfer of data from the first memory device to the second memory device, first transfer instructions to transfer data in a first transfer unit in an order of addresses. The second transfer arbiter circuit outputs, in response to the first transfer instruction, second transfer instructions to transfer the data of the first transfer unit in a second transfer unit smaller than the first transfer unit. The second transfer arbiter circuit outputs the second transfer instruction in an order of accessible addresses in the first and second memory devices.

13 Claims, 14 Drawing Sheets

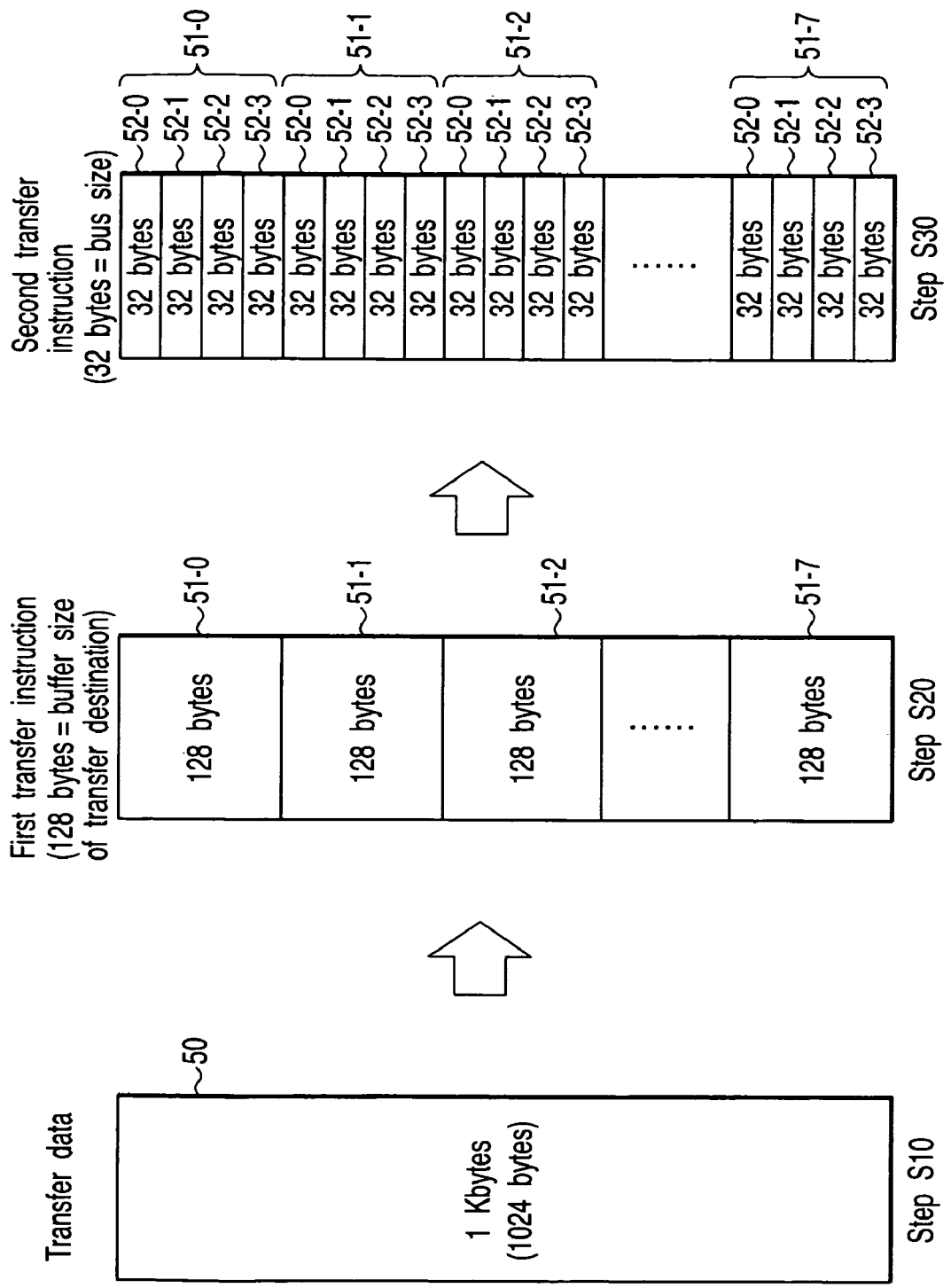
F I G. 3

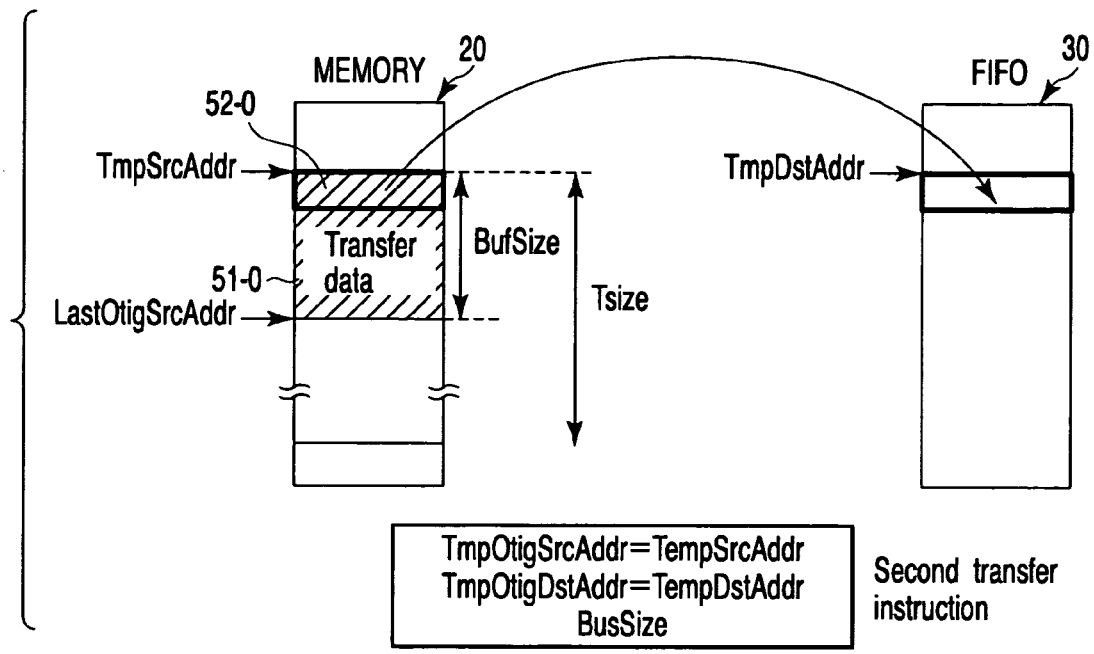
F I G. 8
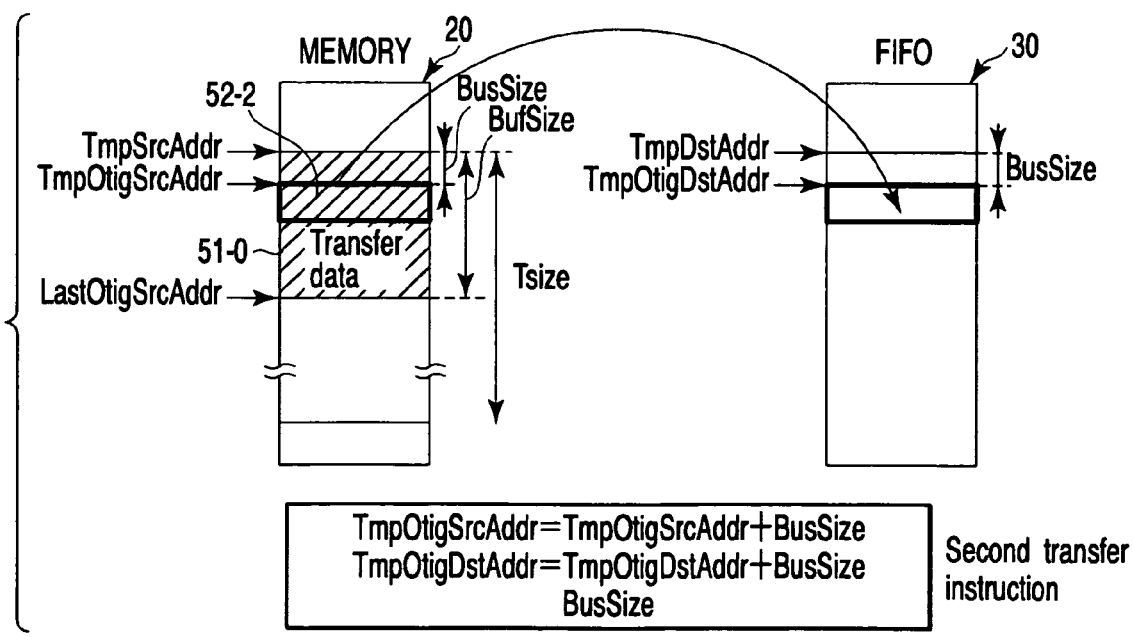
F I G. 9

| Address | Kind of memory | Buffer size |
|---|---|---|
| A | DRAM0:Bank0 | 128 |
| B | DRAM0:Bank1 | 128 |
| C | DRAM0:Bank2 | 128 |
| D | DRAM0:Bank3 | 128 |
| F | DRAM1:Bank0 | 256 |
| G | DRAM1:Bank1 | 256 |
| H | DRAM1:Bank2 | 256 |
| I | DRAM1:Bank3 | 256 |
| J | FIFO0:Entry0 | 128 |
| K | FIFO0:Entry1 | 128 |
| L | FIFO0:Entry2 | 128 |
| M | FIFO0:Entry3 | 128 |
| N | FIFO1:Entry0 | 256 |
| O | FIFO1:Entry1 | 256 |
| P | FIFO1:Entry2 | 256 |
| Q | FIFO1:Entry3 | 256 |

Buffer size table

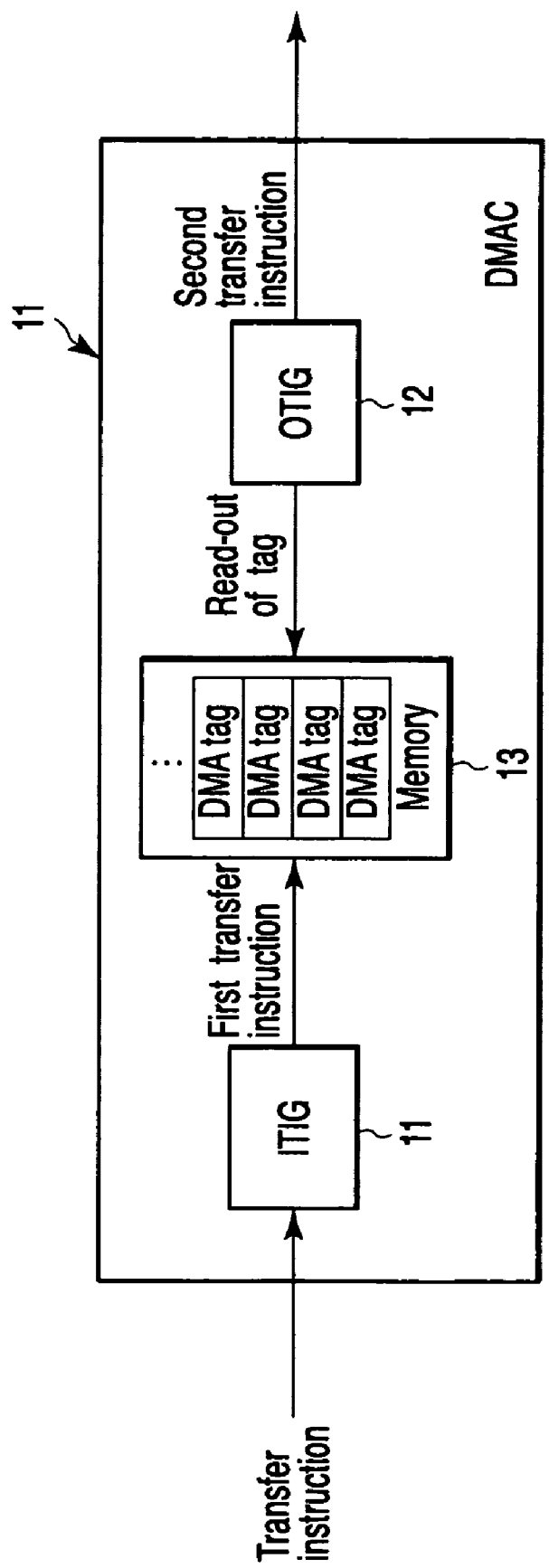
F I G. 20

DATA TRANSFER DEVICE WHICH EXECUTES DMA TRANSFER, SEMICONDUCTOR INTEGRATED CIRCUIT DEVICE AND DATA TRANSFER METHOD

CROSS-REFERENCE TO RELATED APPLICATIONS

This application is based upon and claims the benefit of priority from prior Japanese Patent Applications No. 2005-136149, filed May 9, 2005, the entire contents of which are incorporated herein by reference.

BACKGROUND OF THE INVENTION

1. Field of the Invention

The present invention relates generally to a data transfer device, a semiconductor integrated circuit device and a data transfer method, and relates, for instance, to DMA (Direct Memory Access) transfer.

2. Description of the Related Art

In recent years, DMA transfer techniques have widely been used. When DMA transfer is executed, memories, devices, etc. are connected to a DMA controller (hereinafter referred to as DMAC). The DMAC controls data transfer. DMA transfer is disclosed, for instance, in Jpn. Pat. Appln. KOKAI Publication No. H9-223102 and Jpn. Pat. Appln. KOKAI Publication No. 2002-259326. According to the DMA transfer, data transfer can be executed between memories or devices without intervention of a CPU (Central Processing Unit). Thus, the load on the CPU can be reduced, and the system performance can be enhanced.

In the conventional DMA transfer, however, there is such a problem that the efficiency of data transfer would deteriorate in a case where a transfer-source device or a transfer-destination device can execute data read-out or data write only in an in-order scheme.

BRIEF SUMMARY OF THE INVENTION

A data transfer device, which controls data transfer between a first memory device and a second memory device, according to an aspect of the present invention includes:

a first transfer arbiter circuit which outputs, in response to a transfer instruction for transfer of data from the first memory device to the second memory device, first transfer instructions to transfer data in a first transfer unit in an order of addresses; and a second transfer arbiter circuit which outputs, in response to the first transfer instruction, second transfer instructions to transfer the data of the first transfer unit in a second transfer unit smaller than the first transfer unit, the second transfer arbiter circuit outputting the second transfer instruction in an order of accessible addresses in the first and second memory devices.

A semiconductor integrated circuit device according to an aspect of the present invention includes:

a first memory device;

a second memory device which receives data from the first memory device;

a bus which connects the first and second memory devices and transmits the data; and a data transfer device which controls transfer of the data between the first and second memory devices via the bus, the data transfer device including:

a first transfer arbiter circuit which generates, in an order of addresses, first transfer instructions each of which instructs division of data into a plurality of first division data each having a predetermined data size and instructs transfer of the first division data from the first memory device to the second memory device; and a second transfer arbiter circuit which generates, upon receiving the first transfer instruction, second transfer instructions each of which instructs division of the first division data into a plurality of second division data each having a transfer width of the bus and instructs transfer of the second division data, the second transfer arbiter circuit executing transfer of the second division data in an order of accessible areas in the first and second memory devices.

A data transfer method for data transfer between a first memory device and a second memory device, according to an aspect of the present invention includes:

outputting a first transfer instruction to transfer the data in the first memory device to the second memory device in a first transfer unit in an order of addresses;

generating, in response to the first transfer instruction, a second transfer instructions to transfer the data of the first transfer unit in a second transfer unit smaller than the first transfer unit; and outputting the second transfer instruction to the first and second memory devices in an order of accessible addresses in the first and second memory devices.

BRIEF DESCRIPTION OF THE SEVERAL VIEWS OF THE DRAWING

FIG. 3 is a conceptual view of transfer data for explaining the data transfer method according to the first embodiment of the invention;

FIG. 8 is a conceptual view of transfer data for explaining the data transfer method according to the first embodiment of the invention;

FIG. 9 is a conceptual view of transfer data for explaining the data transfer method according to the first embodiment of the invention;

FIG. 20 is a block diagram of a data transfer device according to a fifth embodiment of the invention.

DETAILED DESCRIPTION OF THE INVENTION

Figure 1:
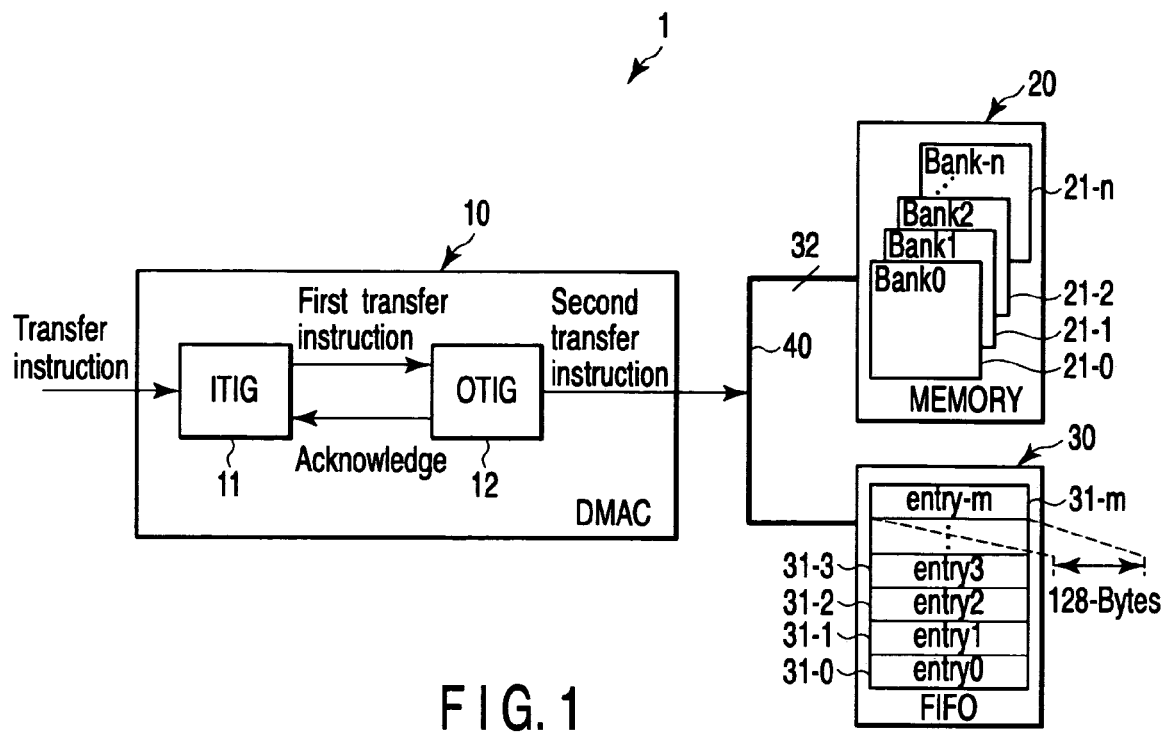
FIG. 1 is a block diagram that shows a semiconductor integrated circuit device according to a first embodiment of the present invention.

A data transfer device, a semiconductor integrated circuit device and a data transfer method according to a first embodiment of the present invention will now be described with reference to FIG. 1. FIG. 1 is a block diagram of a semiconductor integrated circuit (LSI) 1 according to this embodiment. As is shown in FIG. 1, the LSI 1 comprises a DMAC 10, memories 20 and 30, and a bus 40.

The DMAC 10 controls data transfer between the memory 20 and memory 30. The DMAC 10 includes an in-order transfer instruction generator (ITIG) 11 and an out-of-order transfer instruction generator (OTIG) 12. The ITIG 11 receives a data transfer instruction and generates a transfer instruction with a data size corresponding to a buffer size of a transfer-source memory or a transfer-destination memory. In response to the transfer instruction generated by the ITIG 11, the OTIG 12 divides data designated by the transfer instruction, and generates a transfer instruction for transferring divided data in an out-of-order scheme.

The memory 20 is a memory capable of executing data read/write in an out-of-order scheme, and is, e.g. a DRAM. The memory 20 includes a plurality of banks 21-0 to 21-n, and the respective banks are accessible at random.

The memory 30 is a FIFO (First-In-First-Out) scheme memory that executes data read/write in order. For the purpose of convenience, the memory 30 is referred to as FIFO 30. The FIFO 30 includes a plurality of entries 31-0 to 31-m, and stores data in the order of entries 31-0 to 31-m. The bit width of 1 entry is, e.g. 128 bytes.

The bus 40 transmits data between the memory 20 and FIFO 30, and also transmits transfer instructions from the DMAC 10. The bit width of the bus 40 is, e.g. 32 bytes. Thus, when data for 1 entry is transferred to the FIFO 30 (or from FIFO 30), the data is divided into four units (32 bytes×4=128 bytes).

Figure 2:
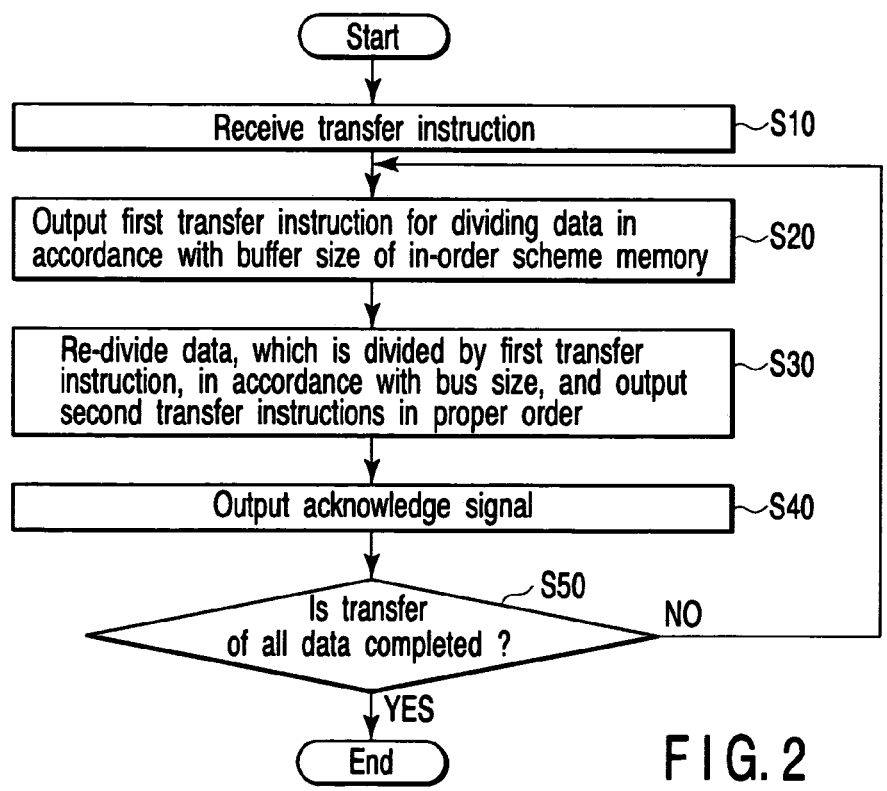
FIG. 2 is a flow chart illustrating a data transfer method according to the first embodiment of the invention.

Next, the data transfer method executed by the DMAC 10 according to this embodiment is described with reference to FIG. 2 and FIG. 3. FIG. 2 is a flow chart illustrating the data transfer method of this embodiment. FIG. 3 is a conceptual view showing the states of transfer data at the time of data transfer.

To start with, the DMAC 10 receives a data transfer instruction from outside (step S10). At this time, the DMAC 10 receives a first address of an area in the transfer-source memory where data to be transferred is stored (hereafter referred to as source address SrcAddr), a first address of an area in the transfer-destination memory where the transfer data is to be stored (hereafter referred to as destination address DstAddr), and a data size TSize of the transfer data. For example, assume that the data size TSize of transfer data 50 is 1 kBytes, as shown in FIG. 3.

Subsequently, the ITIG 11 of the DMAC 10 divides the transfer data 50 in accordance with the buffer size of the in-order scheme memory, and generates a transfer instruction for each divided transfer data (hereinafter referred to as "first transfer instruction"). In the example of FIG. 1, the in-order scheme memory is the FIFO 30, and its buffer size is 128 bytes. Thus, as shown in FIG. 3, the transfer data 50 is divided into eight division data 51-0 to 51-7 (1024 bytes/128 bytes=8). The first transfer instructions are generated for the respective division data 51-0 to 51-7. Needless to say, the data size of each of the division data 51-0 to 51-7 is 128 bytes. At first, the ITIG 11 outputs the first transfer instruction relating to the division data 50-0 to the OTIG 12. The first transfer instruction includes, with respect to each division data, 51-0 to 51-7, a first address of an area where division data to be transferred is stored (hereinafter referred to as "source address TmpSrcAddr"), a first address of an area in the transfer destination where the transferred division data is to be stored (hereinafter referred to as "destination address TmpDstAddr"), and a data size BufSize of the division data. The information of these items is hereinafter referred to as "DMA tag". At the time instant when the first transfer instruction is output, actual data transfer is yet to be executed.

Next, the OTIG 12 received the DMA tag further divides any one of the received division data 51-0 to 51-7 in accordance with the bus size, and generates a transfer instruction ("second transfer instruction") in association with each of the further divided division data (hereinafter referred to as "re-division data"). In the example of FIG. 1, the size of the bus 40 is 32 bytes. Thus, as shown in FIG. 3, each division data, 51-0 to 51-7, is re-divided into four re-division data 52-0 to 52-3. Second transfer instructions are generated for the respective re-division data 52-0 to 52-3. Needless to say, the data size of each of the re-division data 52-0 to 52-3 is 32 bytes. The second transfer instruction includes, with respect to each re-division data, 52-0 to 52-3, a first address of an area where re-division data to be transferred is stored (hereinafter referred to as "source address TmpOtigSrcAddr"), a first address of an area in the transfer destination where the transferred re-division data is to be stored (hereinafter referred to as "destination address TmpOtigDstAddr"), and a data size BusSize of the re-division data.

The OTIG 12 outputs the second transfer instruction relating to the transferable re-division data, 52-0 to 52-3, to the memory 20 and FIFO 30. By the second transfer instruction, data transfer between the memory 20 and FIFO 30 is executed. In this case, the OTIG 12 alters the order of second transfer instructions on an as-needed basis. That is, the second transfer instructions are not always output in the order of re-division data 52-0 to 52-3. For example, if re-division data 52-0 is not transferable and re-division data 52-1 is transferable, the second transfer instruction relating to the re-division data 52-1 is output prior to the second transfer instruction relating to the re-division data 52-0. At the time when the second transfer instruction is output, actual data transfer is first executed.

If all second transfer instructions relating to any one of division data 51-0 to 51-7 are output and the transfer of the division data between the memory 20 and FIFO 30 is completed, the OTIG 12 returns an acknowledge signal (step S40). If the transfer of all division data 51-0 to 51-7 is completed (step S50), the process is finished. If the transfer of all division data 51-0 to 51-7 is not completed, the process returns to step S20. The ITIG 12 outputs the first transfer instruction relating to the next division data, and repeats the process of steps S30 and S40.

Figure 4:
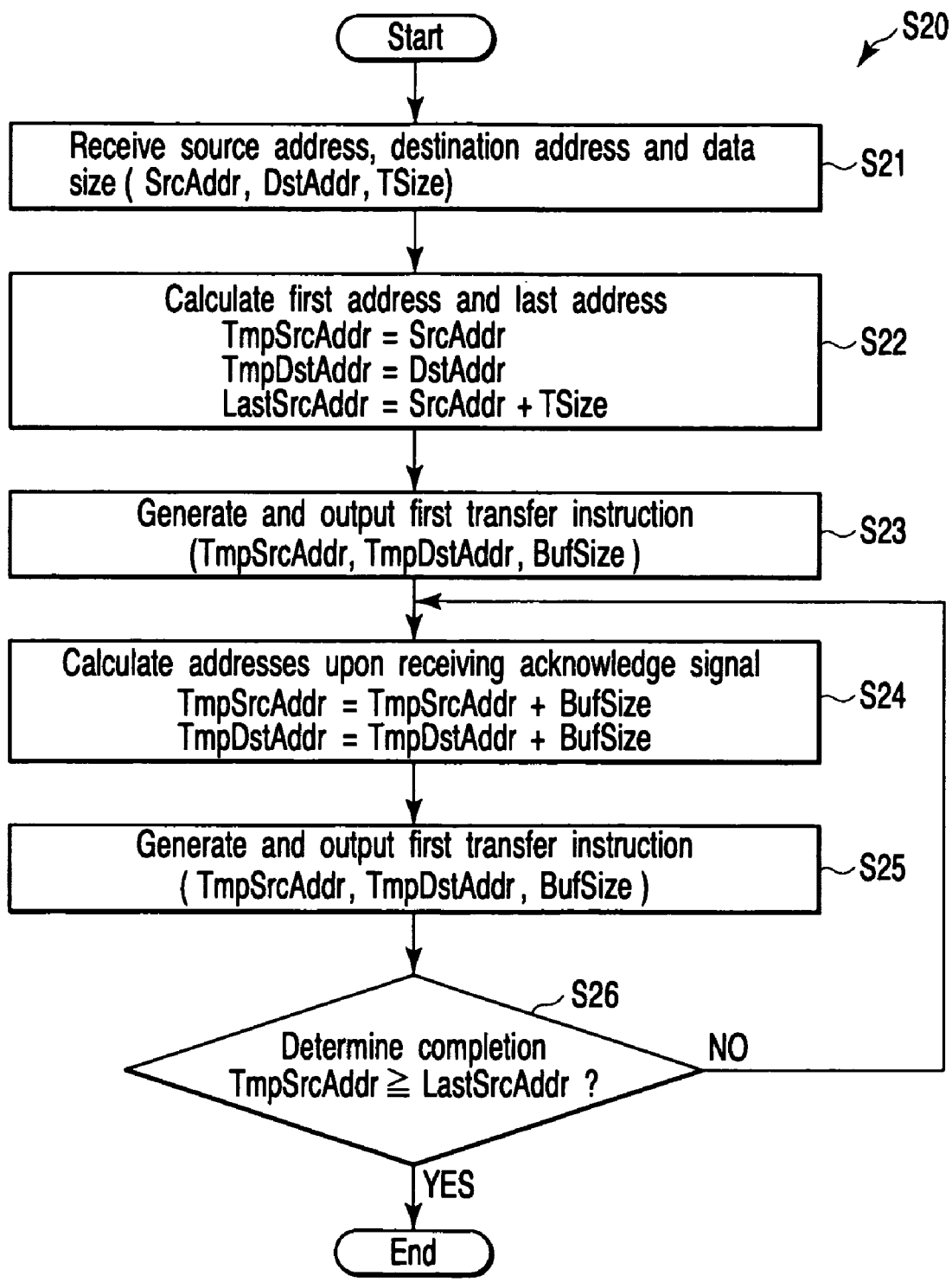
FIG. 4 is a flow chart illustrating the data transfer method according to the first embodiment of the invention.

In the above-described manner, the data transfer between the memory 20 and FIFO 30 is executed. Next, steps S20 and S30 are described in greater detail. Referring to a flow chart of FIG. 4, the process of step S20 executed by the ITIG 11 is described.

To start with, when the DMAC 10 receives a transfer instruction from outside, the ITIG 11 receives a first address of an area where data 50 to be transferred is stored (hereafter referred to as source address SrcAddr), a first address of an area in the transfer destination where the data 50 is to be stored (hereafter referred to as destination address DstAddr), and a data size TSize (step S21).

Then, the ITIG 11 calculates addresses TmpSrcAddr and TmpDstAddr relating to division data 51-0 that is to be first transferred, and a last address LastSrcAddr of data 50 in the transfer source (step S22). As a matter of course, the address TmpSrcAddr and address TmpDstAddr relating to division data 51-0 correspond to the addresses SrcAddr and DstAddr. The last address LastSrcAddr can be calculated by SrcAddr+TSize.

Figure 5:
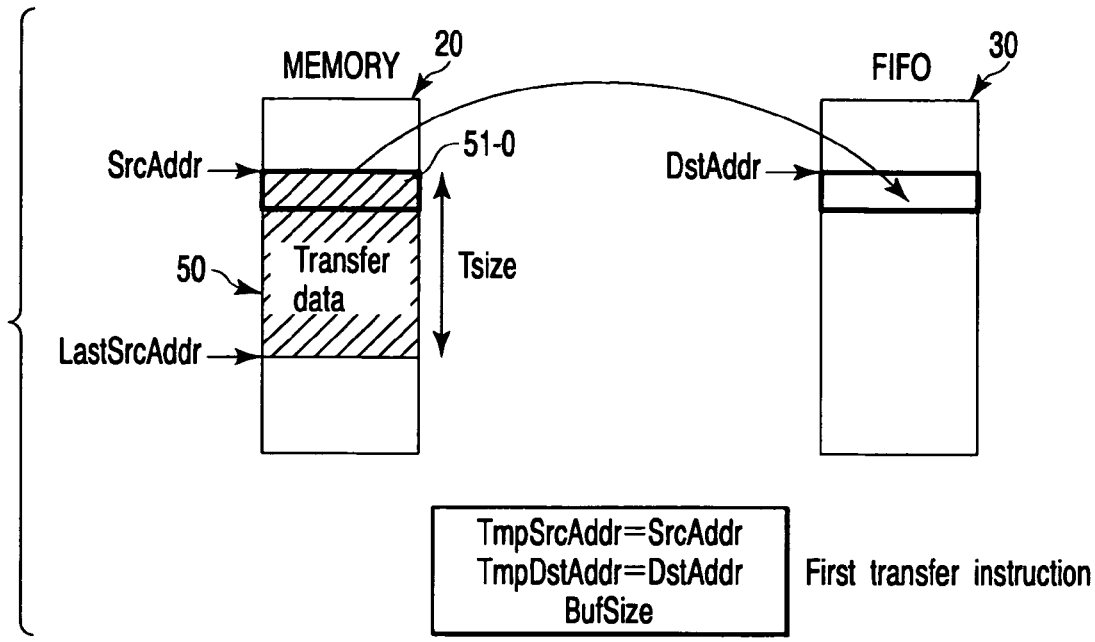
FIG. 5 is a conceptual view of transfer data for explaining the data transfer method according to the first embodiment of the invention.

Based on the addresses TmpSrcAddr and TmpDstAddr that are calculated in step S22 and the buffer size BufSize, the ITIG 11 generates the first transfer instruction and outputs it to the OTIG 12 (step S23). FIG. 5 explains the first transfer instruction. FIG. 5 is a conceptual view of division data transfer, and division data transfer from the memory 20 to FIFO 30 is exemplified. As is illustrated in FIG. 5, the first transfer instruction, which is generated in step S23, is an instruction to the effect that the first division data 51-0 of transfer data 50, which begins with the first address SrcAddr in the memory 20, is to be transferred to the entry in the FIFO 30, which begins with the destination address DstAddr.

Figure 6:
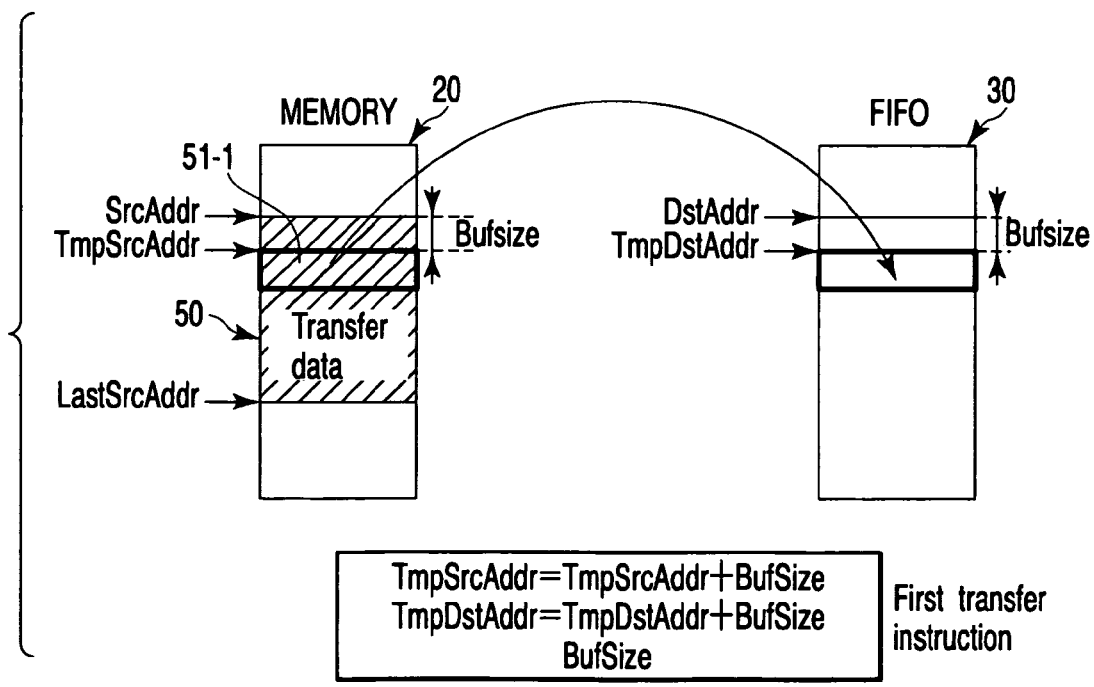
FIG. 6 is a conceptual view of transfer data for explaining the data transfer method according to the first embodiment of the invention.

Upon receiving the acknowledge signal from the OTIG 12, the ITIG 11 calculates addresses TmpSrcAddr and TmpDstAddr relating to the next division data 51-1 (step S24). FIG. 6 illustrates this process. As is illustrated in FIG. 6, the first transfer instruction, which is to be generated next, is an instruction to the effect that the division data 51-1, which is stored at the address subsequent to the division data 51-0, is to be transferred to the address area in the FIFO 30, which follows the division data 51-0. Thus, the source address TmpSrcAddr can be calculated by the immediately preceding TmpSrcAddr+BufSize, and the destination address TmpDstAddr can be calculated by the immediately preceding TmpDstAddr+BufSize.

Following the above, it is determined whether the source address TmpSrcAddr exceeds the last address LastSrcAddr. If the source address TmpSrcAddr exceeds the last address LastSrcAddr, this means that the first transfer instruction relating to the last division data 51-7 has been output, that is, the first transfer instructions relating to all division data 51-0 to 51-7 have been output. Thus, the process of the ITIG 11 is finished. If the source address TmpSrcAddr does not exceed the last address LastSrcAddr, this means that the division data still remains, and thus steps S24 and S25 are repeated.

Figure 7:
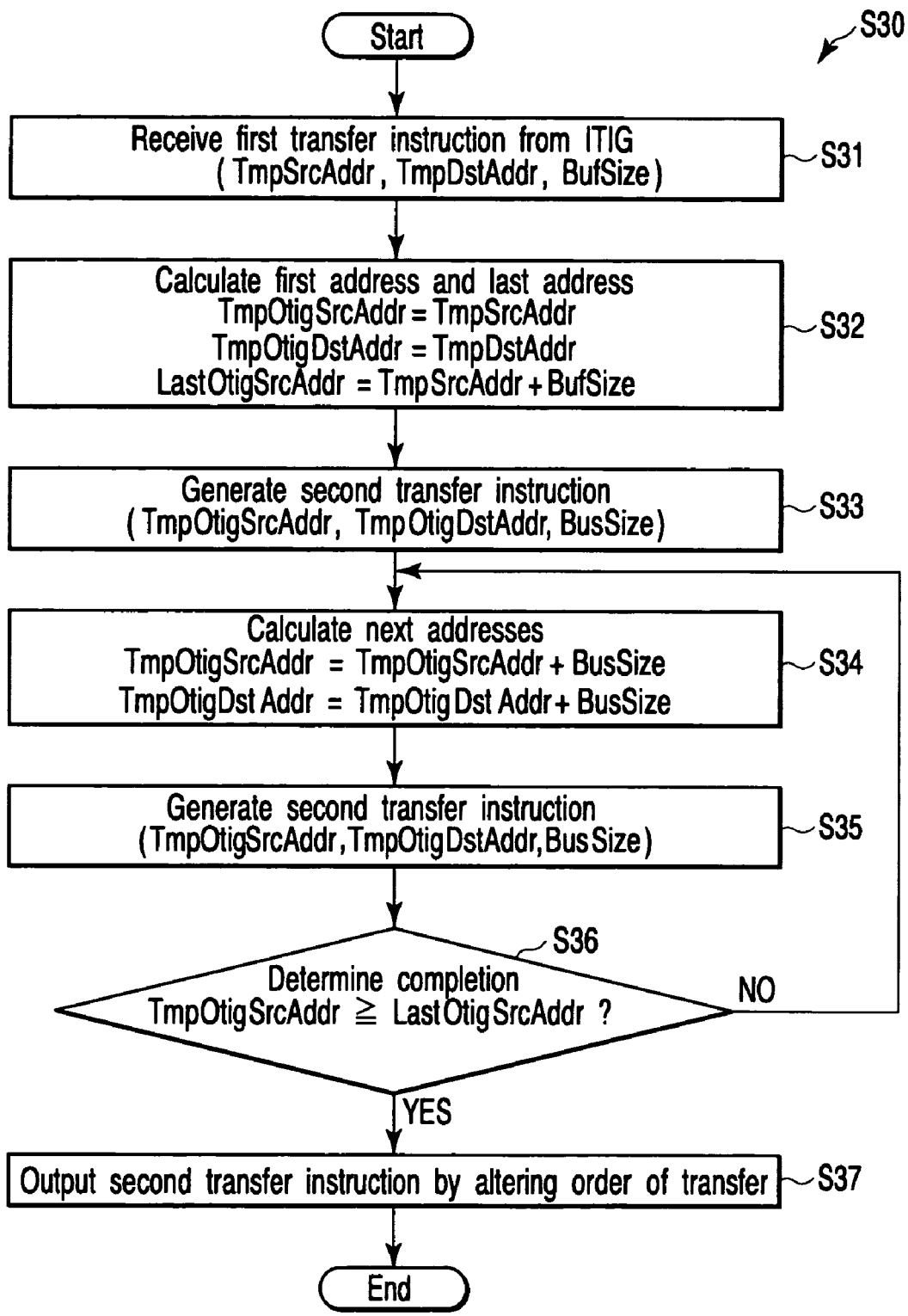
FIG. 7 is a flow chart illustrating the data transfer method according to the first embodiment of the invention.

Next, the process of step S30 that is executed by the OTIG 12 is described with reference to a flow chart of FIG. 7. To start with, the OTIG 12 receives the first transfer instruction from the ITIG 11 (step S31). By receiving the first transfer instruction, the OTIG 12 receives the DMA tag (TmpSrcAddr, TmpDstAddr, BufSize).

Then, the OTIG 12 calculates addresses TmpOtigSrcAddr and TmpOtigDstAddr relating to re-division data 52-0 of the division data 51-0, which is to be first transferred, and a last address LastOtigSrcAddr of the division data 51-0 in the transfer source (step S32). As a matter of course, the source address TmpOtigSrcAddr and destination address TmpOtigDstAddr relating to the re-division transfer data 52-0 correspond to the addresses TmpSrcAddr and TmpDstAddr. The last address LastOtigSrcAddr can be calculated by TmpSrcAddr+BufSize.

Based on the addresses TmpOtigSrcAddr and TmpOtigDstAddr that are calculated in step S32 and the bus size BusSize, the OTIG 12 generates the second transfer instruction (step S33). FIG. 8 explains the second transfer instruction. FIG. 8 is a conceptual view of re-division data transfer, and re-division data transfer from the memory 20 to FIFO 30 is exemplified. As is illustrated in FIG. 8, the second transfer instruction, which is generated in step S33, is an instruction to the effect that the first re-division data 52-0 of division data 51-0, which begins with the first address TmpSrcAddr in the memory 20, is to be transferred to the entry in the FIFO 30, which begins with the destination address TmpDstAddr.

Then, the OTIG 12 calculates addresses TmpOtigSrcAddr and TmpOtigDstAddr relating to the next re-division data 52-1 (step S34). FIG. 9 illustrates this process. As is illustrated in FIG. 9, the second transfer instruction, which is to be generated next, is an instruction to the effect that the re-division data 52-1, which is stored at the address subsequent to the re-division data 52-0, is to be transferred to the address area in the FIFO 30, which follows the re-division data 52-0. Thus, the source address TmpOtigSrcAddr can be calculated by the immediately preceding TmpOtigSrcAddr+BusSize, and the destination address TmpOtigDstAddr can be calculated by the immediately preceding TmpOtigDstAddr+BusSize.

Following the above, it is determined whether the source address TmpOtigSrcAddr exceeds the last address LastOtigSrcAddr. If the source address TmpOtigSrcAddr exceeds the last address LastOtigSrcAddr, this means that the second transfer instruction relating to the last re-division data 52-3 has been output, that is, the second transfer instructions relating to all re-division data 52-0 to 52-3 have been output. Thus, the OTIG 12 alters the order of second transfer instructions so that the re-division data 52-0 to 52-3 may be transferred with the highest efficiency at this time instant, and the OTIG 12 outputs the second transfer instructions to the memory 20 and FIFO 30.

As has been described above, high-efficiency data transfer can be realized by the data transfer device, semiconductor integrated circuit device and data transfer method according to the first embodiment of the invention. According to this embodiment, when data transfer is performed between a memory that executes data read/write in an in-order scheme and a memory that executes data read/write in an out-of-order scheme, in-order data transfer is executed with respect to a minimum unit of data that is handled in the memory that executes data read/write in the in-order scheme. The minimum unit of data is further divided into a plurality of data, and the divided data are transferred in the out-of-order scheme. In short, the in-order scheme is adopted for data transfer in a macroscopic level, and the out-of-order scheme is adopted for data transfer in a microscopic level. Since the out-of-order scheme can be applied to the in-order scheme memory, the data transfer efficiency can be enhanced. The advantageous effect of this feature is remarkable, for example, when data transfer is executed between a memory in which a bank conflict may occur, and an in-order scheme memory. A second embodiment of the invention, which relates to this kind of case, will be described below, taking a DRAM and a FIFO by way of example.

Figure 10:
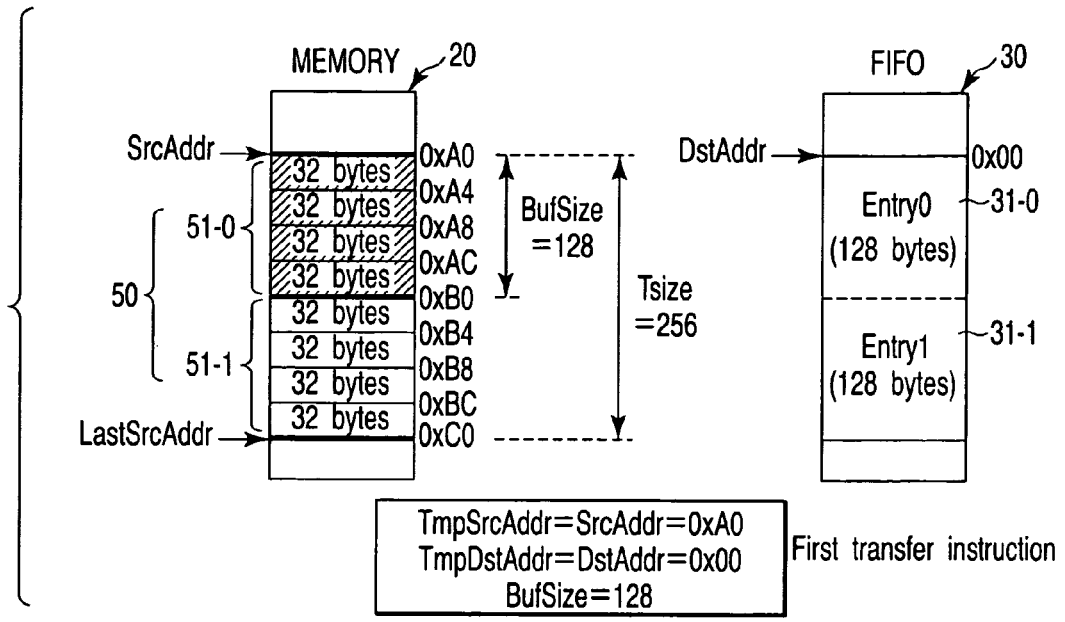
FIG. 10 is a conceptual view of transfer data for explaining a data transfer method according to a second embodiment of the invention.

A data transfer device, a semiconductor integrated circuit device and a data transfer method according to a second embodiment of the present invention will now be described with reference to FIG. 10. This embodiment relates to a case where the memory 20 in the first embodiment is a DRAM. FIG. 10 is a conceptual view of the memory spaces in the DRAM 20 and FIFO 30.

Assume now that data 50 of 256 bytes (TSize), which is stored in the DRAM 20 is to be transferred to entry 0 and entry 1 in the FIFO 30, as illustrated in FIG. 10. Since the entry size (BufSize) of the FIFO 30 is 128 bytes, the data 50 is divided into two division data 51-0 and 51-1 by the ITIG 11. To begin with, the ITIG 11 generates a first transfer instruction relating to the division data 51-0, and outputs it to the OTIG 12. The content of the DMA tag is TmpSrcAddr=0xA0, TmpDstAddr=0x00, and BufSize=128. Specifically, the first transfer instruction, which instructs transfer of data 51-0 that is stored in addresses 0xA0 to 0xAF in the DRAM 20 to the entries beginning with address 0x00 in the FIFO 30, is delivered to the OTIG 12.

Figure 11:
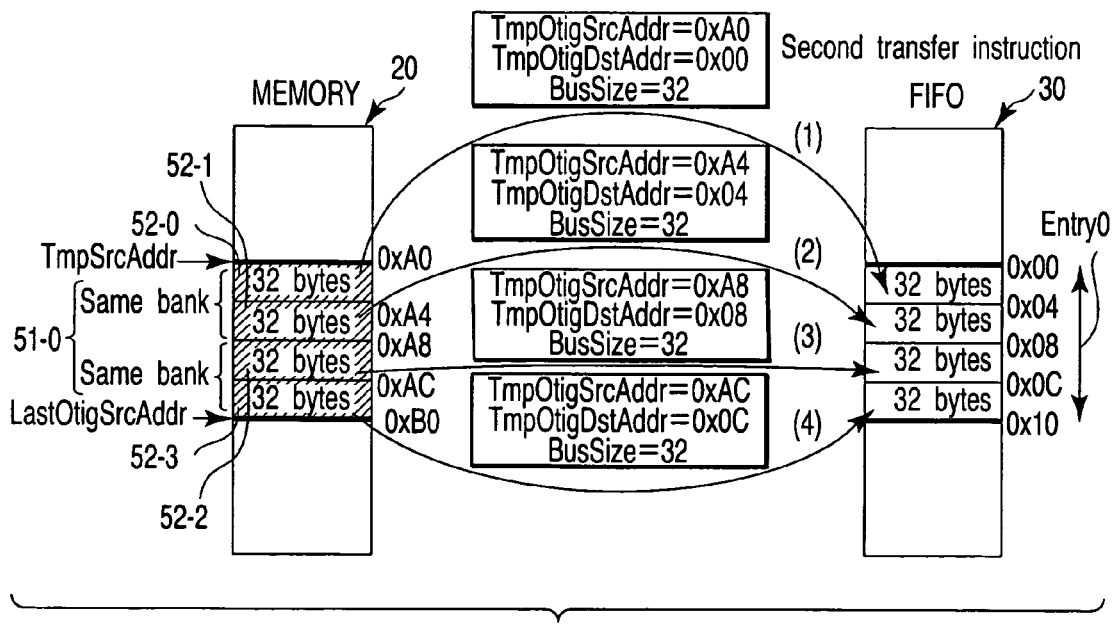
FIG. 11 is a conceptual view of transfer data for explaining the data transfer method according to the second embodiment of the invention.

Next, the OTIG 12 generates a second transfer instruction, thereby to execute out-of-order data transfer. FIG. 11 illustrates this process. As shown in FIG. 11, the OTIG 12 generates the following four second transfer instructions relating to the division data 51-0:

1: TmpOtigSrcAddr=0xA0 TmpOtigDstAddr=0x00 BusSize=32
2: TmpOtigSrcAddr=0xA4 TmpOtigDstAddr=0x04 BusSize=32
3: TmpOtigSrcAddr=0xA8 TmpOtigDstAddr=0x08 BusSize=32
4: TmpOtigSrcAddr=0xAC TmpOtigDstAddr=0x0C BusSize=32.

The OTIG 12 outputs these four second transfer instructions so that a maximum transfer efficiency may be obtained. Assume that the area (re-division data 52-0) at addresses 0xA0 to 0xA3 and the area (re-division data 52-1) at addresses 0xA4 to 0xA7 in the DRAM are included in the same bank, and the area (re-division data 52-2) at addresses 0xA8 to 0xAB and the area (re-division data 52-3) at addresses 0xAC to 0xAF in the DRAM are included in the same bank. In this case, if data transfer is to be executed in the order of the re-division data 52-0 to 52-3, a problem of a bank conflict would occur.

Figure 12:
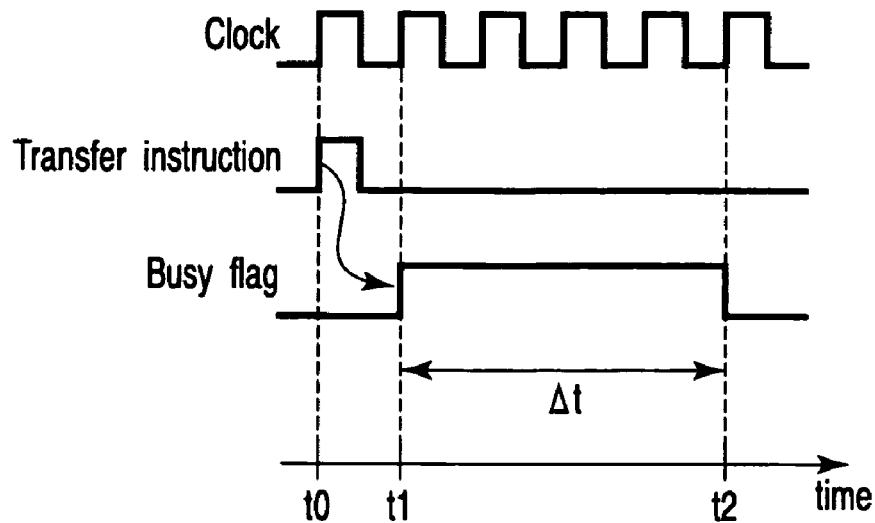
FIG. 12 is a timing chart of various signals when a transfer instruction is issued to a DRAM.
Figure 13:
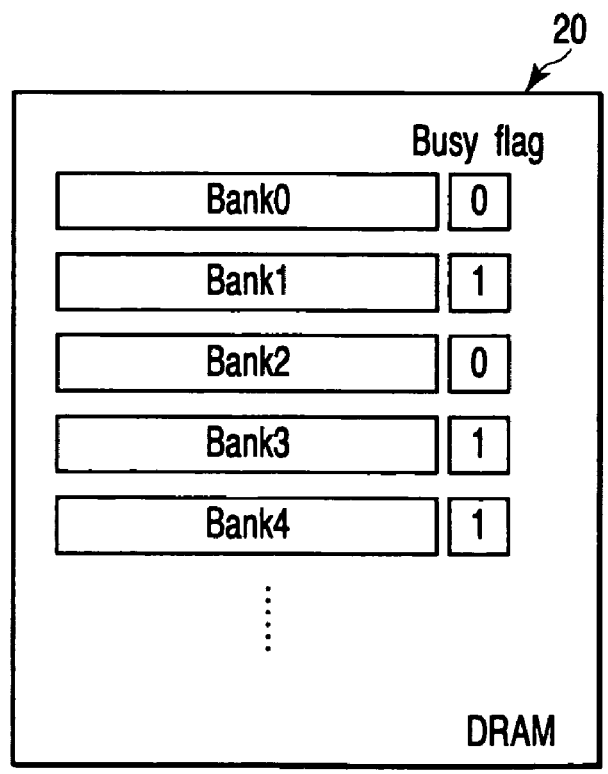
FIG. 13 is a block diagram that shows a bank structure of the DRAM.

The bank conflict is such a problem that when the same bank is successively accessed, the bank goes into a "busy" state for a predetermined time period and access to the bank is disabled. If a bank conflict occurs, the process has to stand by until the bank conflict disappears. FIG. 12 is a timing chart of various signals when the DRAM is accessed. In FIG. 12, at time instant t0, a transfer instruction is issued to a given bank. Access to the bank is disabled for a predetermined time period Δt from time instant t1. Thus, at time instant t2, the bank becomes accessible once again. During the time period Δt, a busy flag of the bank is set at "1". As is shown in FIG. 13, the busy flag is provided for each of the banks. The busy flag "1" indicates that the associated bank is inaccessible.

Figure 14:
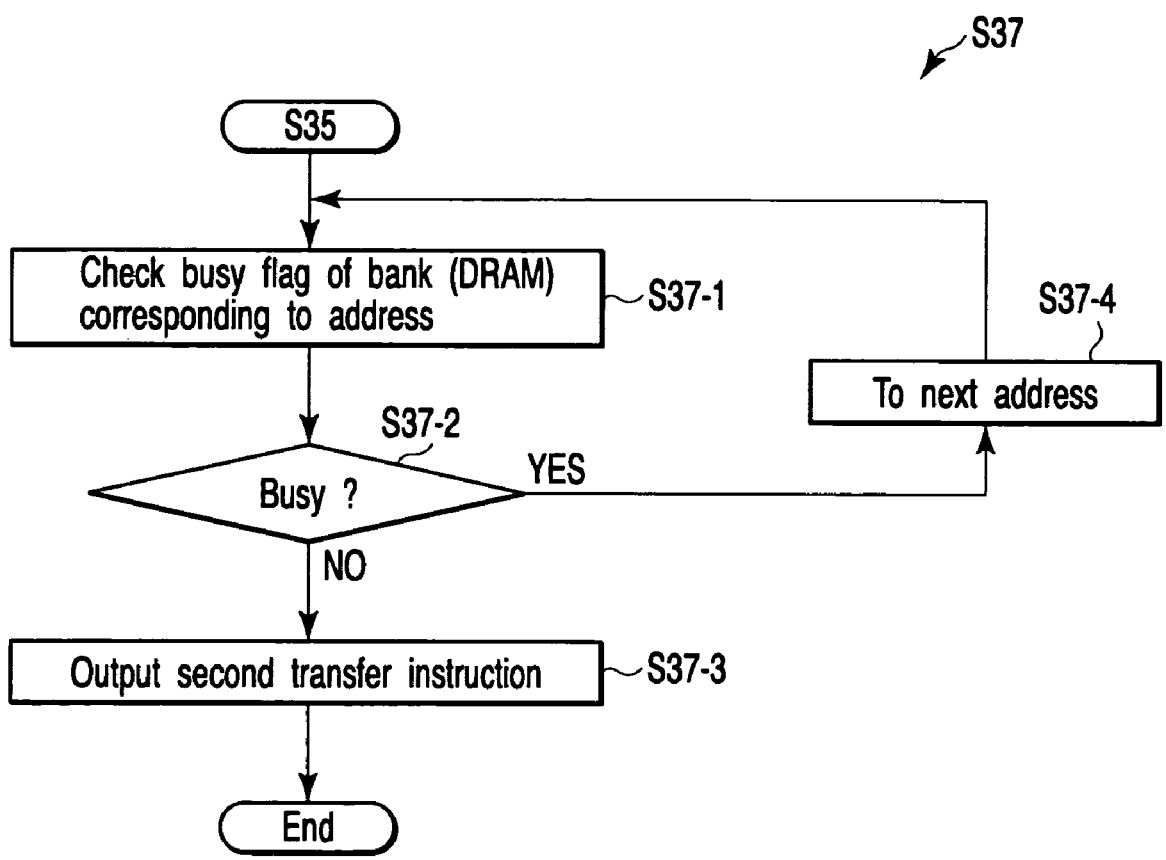
FIG. 14 is a flow chart illustrating the data transfer method according to the second embodiment of the invention.

Referring back to FIG. 11, when the OTIG 12 determines the order of output of the second transfer instructions, the OTIG 12 checks the busy flags of the banks that store the re-division data 52-0 to 52-3. FIG. 14 is a flow chart illustrating the process in the OTIG 12 at this time. As is shown in FIG. 14, the OTIG 12 checks the busy flag of the bank corresponding to the address of the area in which the re-division data that is currently of interest is stored (step S37-1). If the busy flag is not set (step S37-2), the bank is accessible. Thus, the second transfer instruction relating to the re-division data is output (step S37-3). If the busy flag is set (step S37-2), attention is paid to the re-division data that is stored at the next address (step S37-4), and step S37-1 is executed. This process is repeated until the transfer of all re-division data is completed.

For example, in the case of FIG. 11, if the re-division data 52-0 is first transferred, the bank associated with the re-division data 52-0 goes into the busy state and becomes inaccessible for a predetermined time period. In other words, in order to access the re-division data 52-1, it is necessary to stand by until the busy state ends. Thus, the OTIG 12 transfers the re-division data 52-2 that is stored in a different bank that is not in the busy state. If the busy state of the bank that stores the re-division data 52-1 ends while the re-division data 52-2 is being transferred, the OTIG 12 subsequently executes transfer of the re-division data 52-1. At last, the OTIG 12 executes transfer of the re-division data 52-3.

If the transfer of the division data 51-0 is completed, the OTIG 12 returns the acknowledge signal to the ITIG 11. Then, the ITIG 11 outputs the first transfer instruction relating to the division data 51-1, and repeats the above-described process.

Figure 15:
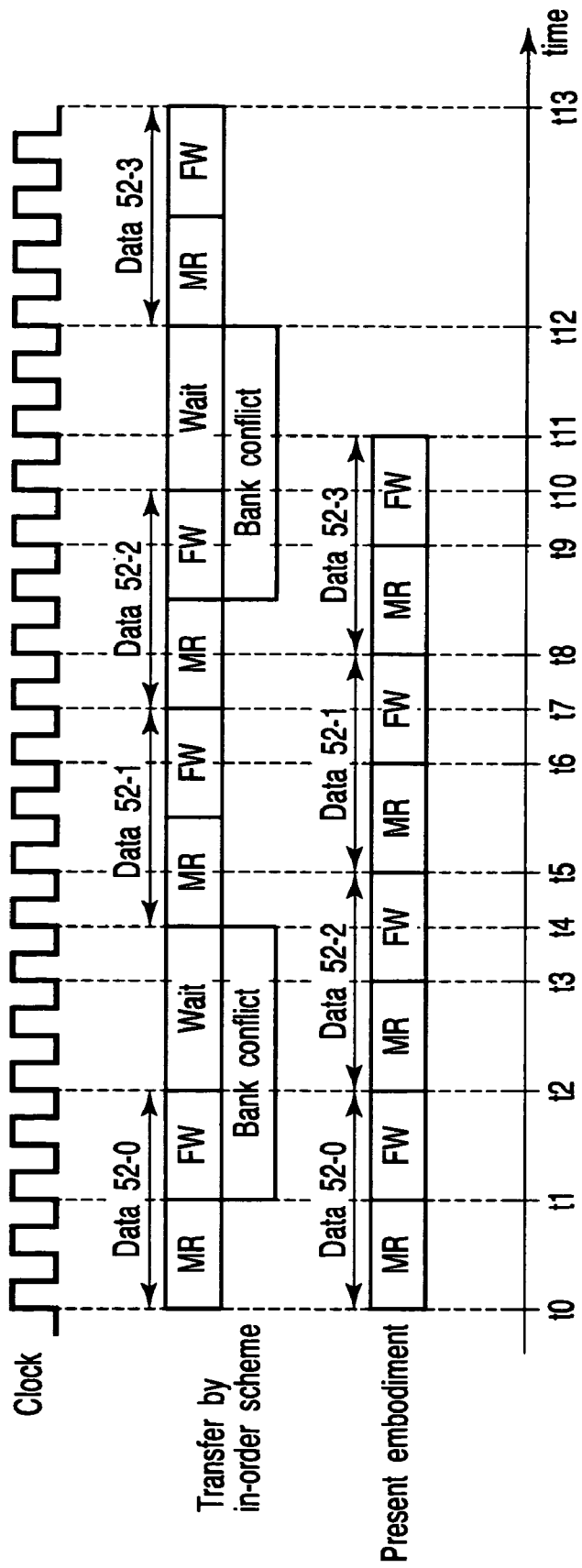
FIG. 15 is a timing chart of data transfer, FIG. 15 explaining the advantageous effect of the data transfer method according to the second embodiment of the invention.

As has been described above, the OTIG 12 alters the order of output of the second transfer instructions so as to avoid occurrence of a bank conflict. Thereby, the data transfer efficiency can be enhanced. This point will be described referring to a timing chart of FIG. 15. In FIG. 15, MR denotes the operation of data read-out from the DRAM, FW designates the operation of data write in the FIFO, and Wait indicates a wait time due to a bank conflict. A time corresponding to 2 clock cycles is needed for each of MR and FW, a time of 3 clock cycles is needed for Wait.

To begin with, a description is given of the case in which the re-division data 52-0 to 52-3 are transferred by the in-order scheme from the DRAM 20 to FIFO 30 in the order of addresses, without using the method of the present embodiment. As is shown in FIG. 15, if transfer of re-division data 52-0 is started at time instant t0, the transfer of the re-division data 52-0 is completed at time instant t2. At time instant t2, the bank that stores the data 52-0 and 52-1 is in the busy state. Thus, transfer of data 52-1 can be started earliest at time instant t4, which is 3 clock cycles after time instant t2. No bank conflict occurs at the time of transfer of data 52-1 and 52-2, but a bank conflict occurs once again at the time of transfer of data 52-3. At time t10, the transfer of the data 52-2 is completed, but the transfer of the next data 52-3 is postponed until t12 at which the busy state of the associated bank ends. As a result, the transfer of the re-division data 52-0 to 52-3 ends at time instant t13.

By contrast, in the method of the present embodiment, the re-division data are written in the FIFO 30 in the order of re-division data 52-0, 52-2, 52-1 and 52-3. Thus, the problem of the bank conflict does not arise. Therefore, no useless wait time occurs and the continuous transfer of re-division data can be executed. As a result, compared to the transfer method using only the in-order scheme, the data transfer is completed at time instant t11, which is earlier by a time corresponding to two wait time periods, i.e. 6 clock cycles.

Figure 16:
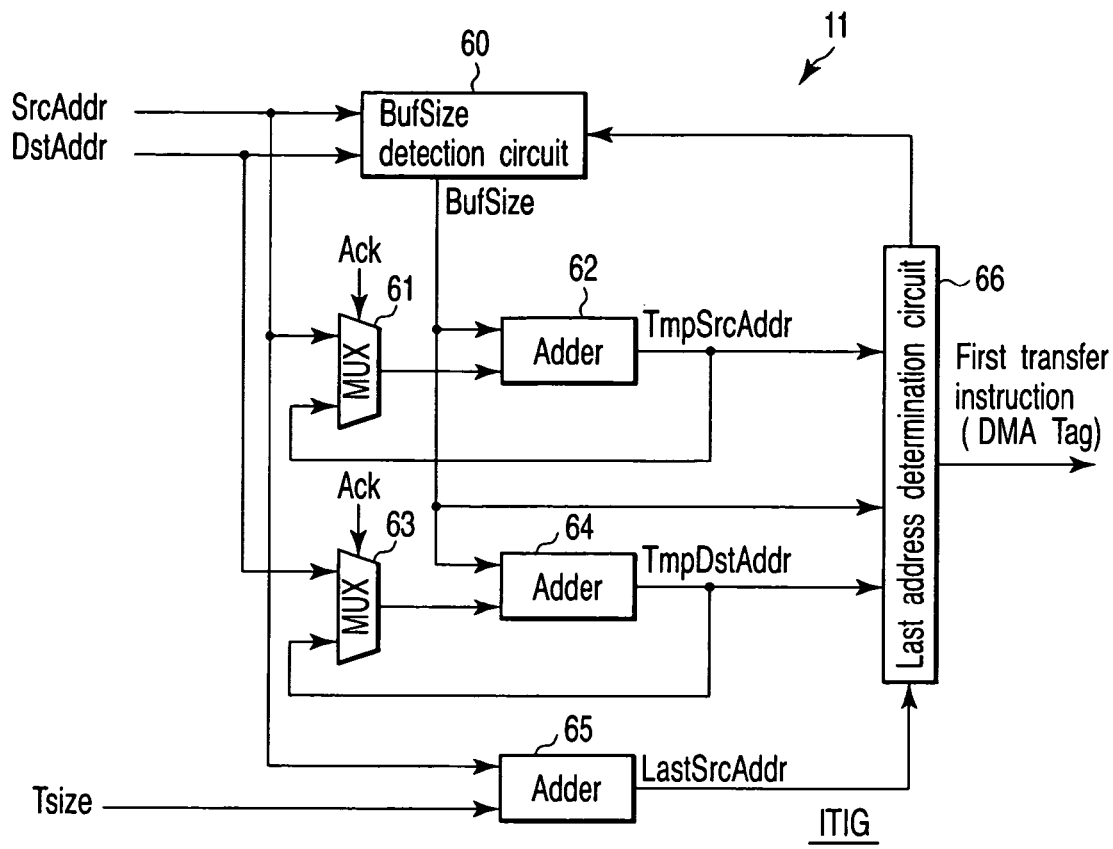
FIG. 16 is a block diagram of an in-order transfer instruction generator that is included in a data transfer device according to a third embodiment of the invention.

Next, a data transfer device, a semiconductor integrated circuit device and a data transfer method according to a third embodiment of the present invention will now be described with reference to FIG. 16. FIG. 16 is a block diagram of the ITIG 11. In the third embodiment, the ITIG 11 in the first and second embodiments is realized by hardware. Thus, a description of the structural parts other than the ITIG 11 is omitted.

As is shown in FIG. 16, the ITIG 11 comprises a buffer size detection circuit 60, multiplexers 61 and 63, adders 62, 64 and 65, and a last address determination circuit 66.

On the basis of addresses SrcAddr and DstAddr that are input from outside, the buffer size detection circuit 60 recognizes a device that is an object of transfer, and detects and outputs a buffer size BufSize. The multiplexer 61 selects one of the source address SrcAddr and an output from the adder 62. The adder 62 adds an output from the multiplexer 61 and the BufSize that is output from the buffer size detection circuit 60, and outputs a source address TmpSrcAddr. The multiplexer 63 selects one of the destination address DstAddr and an output from the adder 64. The adder 64 adds an output from the multiplexer 63 and the BufSize that is output from the buffer size detection circuit 60, and outputs a destination address TmpDstAddr. The adder 65 adds the address SrcAddr and data size TSize, which are input from outside, and outputs a last address LastSrcAddr. The last address determination circuit 66 outputs first transfer instructions, and determines whether all first transfer instructions have been output by comparing the address TmpSrcAddr that is output from the adder 62 and the last address LastSrcAddr.

The operation of the ITIG 11 with the above-described structure is described. Immediately after the transfer instruction is received from outside, the multiplexers 61 and 63 select the source address SrcAddr and destination address DstAddr, respectively. The adders 62 and 64 output the source address SrcAddr and destination address DstAddr, which are selected by the multiplexers 61 and 63, as addresses TmpSrcAddr and TmpDstAddr. In addition, the adder 65 adds the source address SrcAddr and data size TSize, and outputs the last address LastSrcAddr. Thus, the last address determination circuit 66 outputs the first transfer instruction.

Figure 17:
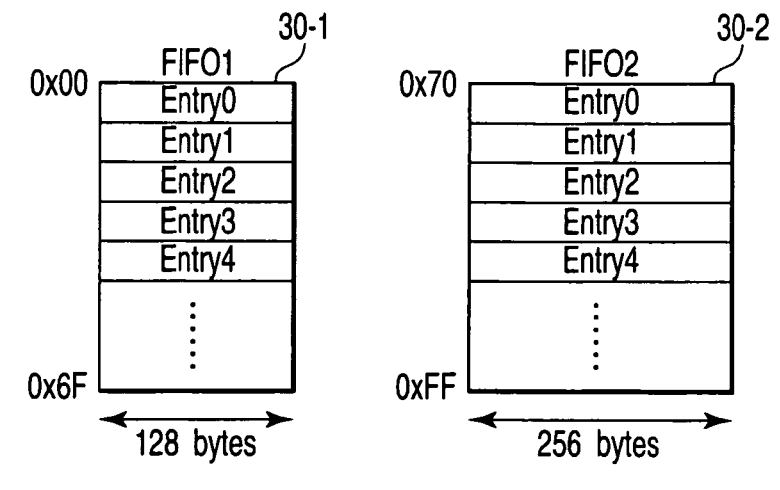
FIG. 17 is a conceptual view of a memory space in FIFOs that are included in the data transfer system according to the third embodiment of the invention.

If the first transfer instruction, which is the first one of all first transfer instructions, is output, the buffer size detection circuit 60 detects the buffer size BufSize on the basis of the source address SrcAddr and destination address DstAddr. The buffer size can be detected on the basis of the addresses that are assigned to the memories 20 and 30. For example, in the case of FIG. 17, if the source address SrcAddr is 0x00 to 0x6F, one of the devices that are objects of transfer is a FIFO 1 and thus the buffer size BufSize is 128 bytes. If the source address SrcAddr is 0x70 to 0xFF, one of the devices that are objects of transfer is a FIFO 2 and thus the buffer size BufSize is 256 bytes.

If an acknowledge signal Ack is received from the OTIG 12, the multiplexers 61 and 63 select outputs from the adders 62 and 64, respectively. Accordingly, the adder 62 adds the source address TmpSrcAddr that is selected by the multiplexer 61, and the buffer size BufSize that is output from the buffer size detection circuit 60, and outputs the next source address TmpSrcAddr. The adder 64 adds the destination address TmpDstAddr that is selected by the multiplexer 63, and the buffer size BufSize that is output from the buffer size detection circuit 60, and outputs the next destination address TmpDstAddr. These data are output as the first transfer instruction from the last address determination circuit 66.

If the source address TmpSrcAddr exceeds the last address, the last address determination circuit 66 does not output a subsequent first transfer instruction, and the process of the ITIG 11 is completed.

According to the present embodiment, the ITIG 11 is formed by hardware that is specifically designed for the first transfer instruction generation/output process. Therefore, the process speed of the ITIG 11 can be enhanced, in addition to the advantageous effects that have been described in connection with the first and second embodiments.

Figures 18, 19:
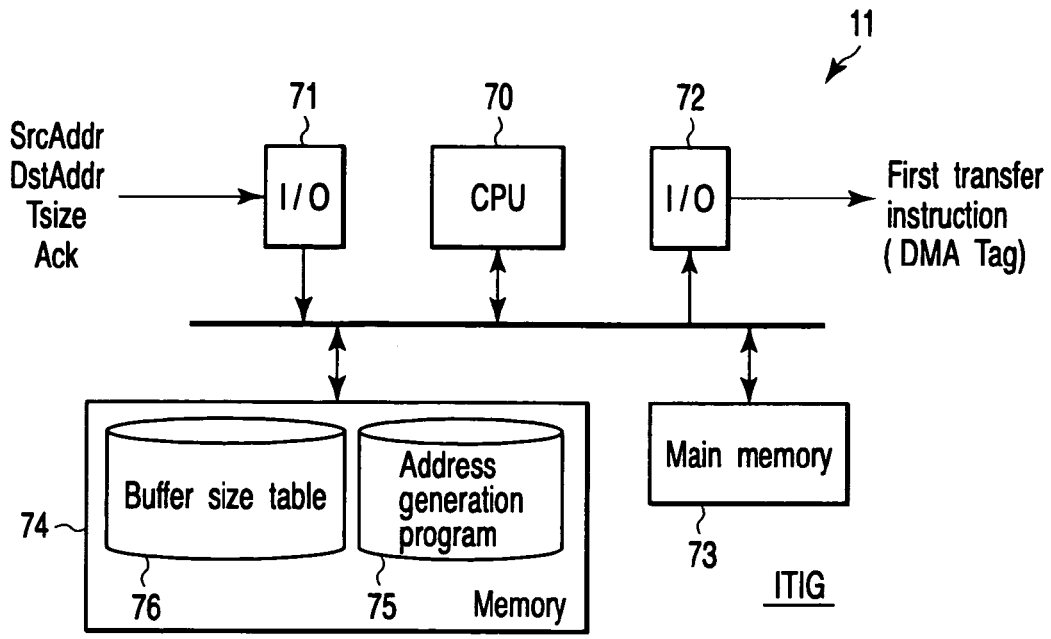
FIG. 18 is a block diagram of an in-order transfer instruction generator that is included in a data transfer device according to a fourth embodiment of the invention.
FIG. 19 is a conceptual view of a buffer size table that is stored in the in-order transfer instruction generator that is included in the data transfer device according to the fourth embodiment of the invention.

Next, a data transfer device and a semiconductor integrated circuit device according to a fourth embodiment of the invention are described with reference to FIG. 18. FIG. 18 is a block diagram of the ITIG 11. In the fourth embodiment, the ITIG 11 in the first and second embodiments is realized by software.

As is shown in FIG. 18, the ITIG 11 comprises a CPU 70, input/output circuits 71 and 72, a main memory 73 and a memory 74. The memory 74 stores an address generation program 75 and a buffer size table 76. The address generation program 75 is a program for generating a DMA tag, and executes the process in step S4 that has been described in connection with the first and second embodiments. The buffer size table 76 stores a relationship between a plurality of devices, whose data transfer is controlled by the DMAC 10, and addresses assigned to the devices. FIG. 19 shows an example of the buffer size table 76. As is shown in FIG. 19, the buffer size table 76 stores addresses, kinds of associated memories, and buffer sizes. For instance, an area beginning with address A corresponds to bank 0 of DRAM 0, and its buffer size is 128 bytes. An area beginning with address J corresponds to entry 0 of FIFO 0, and its buffer size is 128 bytes. An area beginning with address N corresponds to entry 0 of FIFO 1, and its buffer size is 256 bytes.

The input/output circuit 71 receives the source address SrcAddr and destination address DstAddr, which are delivered by the transfer instruction, and also receives data size TSize and the acknowledge signal Ack that is sent from the OTIG 12. The CPU 70 reads out necessary programs and data from the memory 74 and loads them in the main memory 73, and generates a DMA tag. The input/output circuit 72 outputs the DMA tag, which is generated by the CPU 70, to the OTIG 12.

In the above-described structure, if the addresses SrcAddr and DstAddr and TSize are input to the input/output circuit 71, the input/output circuit 71 store these data in the memory 74. The CPU 70 reads out these data, the address generation program 75 and buffer size table 76, and loads them in the main memory 73, and executes the process illustrated in FIG. 4. When the process of step S23 is executed, the CPU 70 collates the buffer size table 76 and the address SrcAddr and recognizes the buffer size BufSize.

As regards the second and following division data, when the input/output circuit 71 receives the acknowledge signal from the OTIG 12, the CPU 70 executes the address generation program 75, using the acknowledge signal as a trigger.

According to the present embodiment, ITIG 11 that executes the first transfer instruction generation/output process is realized by software (computer). Specifically, a computer, which serves as the ITIG 11, is caused to function as source address generating means for adding the source address TmpSrcAddr and the buffer size BufSize, destination address generating means for adding the destination address TmpDstAddr and the buffer size BufSize, last address generating means for adding the source address SrcAddr and the data size TSize, and buffer size generating means for selecting the buffer size BufSize on the basis of the buffer size table 76 and source address SrcAddr. By storing necessary programs in the memory 74, the ITIG 11 may be provided with functions other than the function for the first transfer instruction generation/input process. Therefore, in addition to the advantageous effects that have been described in connection with the first and second embodiments, it is possible to realize a multi-functional configuration of the data transfer device.

Next, a data transfer device, a semiconductor integrated circuit device and a data transfer method according to a fifth embodiment of the invention will now be described with reference to FIG. 20. In the fifth embodiment, a queue is provided between the ITIG 11 and OTIG 12 in the first to fourth embodiments. FIG. 20 is a block diagram of the DMAC 10.

As is shown in FIG. 20, the DMAC 10 further includes a memory 13 in addition to the structure that has been described in connection with the first to fourth embodiments. The memory 13 stores DMA tags that are generated by the ITIG 11. Without waiting for the acknowledge signal from the OTIG 12, the ITIG 11 successively generates DMA tags upon receiving a transfer instruction and stores the DMA tags in the memory 13. The OTIG 12 does not need to send the acknowledge signal to the ITIG 11. The OTIG 12 selects any one of the DMA tags stored in the memory 13, and generates the second transfer instruction. In the other respects, the structure and operation of the fifth embodiment are the same as those of the first to fourth embodiments.

According to the present embodiment, the OTIG 12 can freely select any one of the DMA tags stored in the memory 13. Thus, the OTIG 12 can have a greater number of DMA tags as possible choices. In addition, the ITIG 11 does not need to wait for the acknowledge signal in order to generate DMA tags. Therefore, the operation speed of the DMAC 10 can be enhanced.

As has been described above, according to the first to fifth embodiments, in the system that transfers data in the in-order scheme, in-order data transfer is executed in units of data, for which the order of data transfer is invariable, and out-of-order data transfer is executed in smaller (microscopic) units of data by altering the order of data transfer. Therefore, a decrease in data transfer efficiency can be suppressed.

Figure 21:
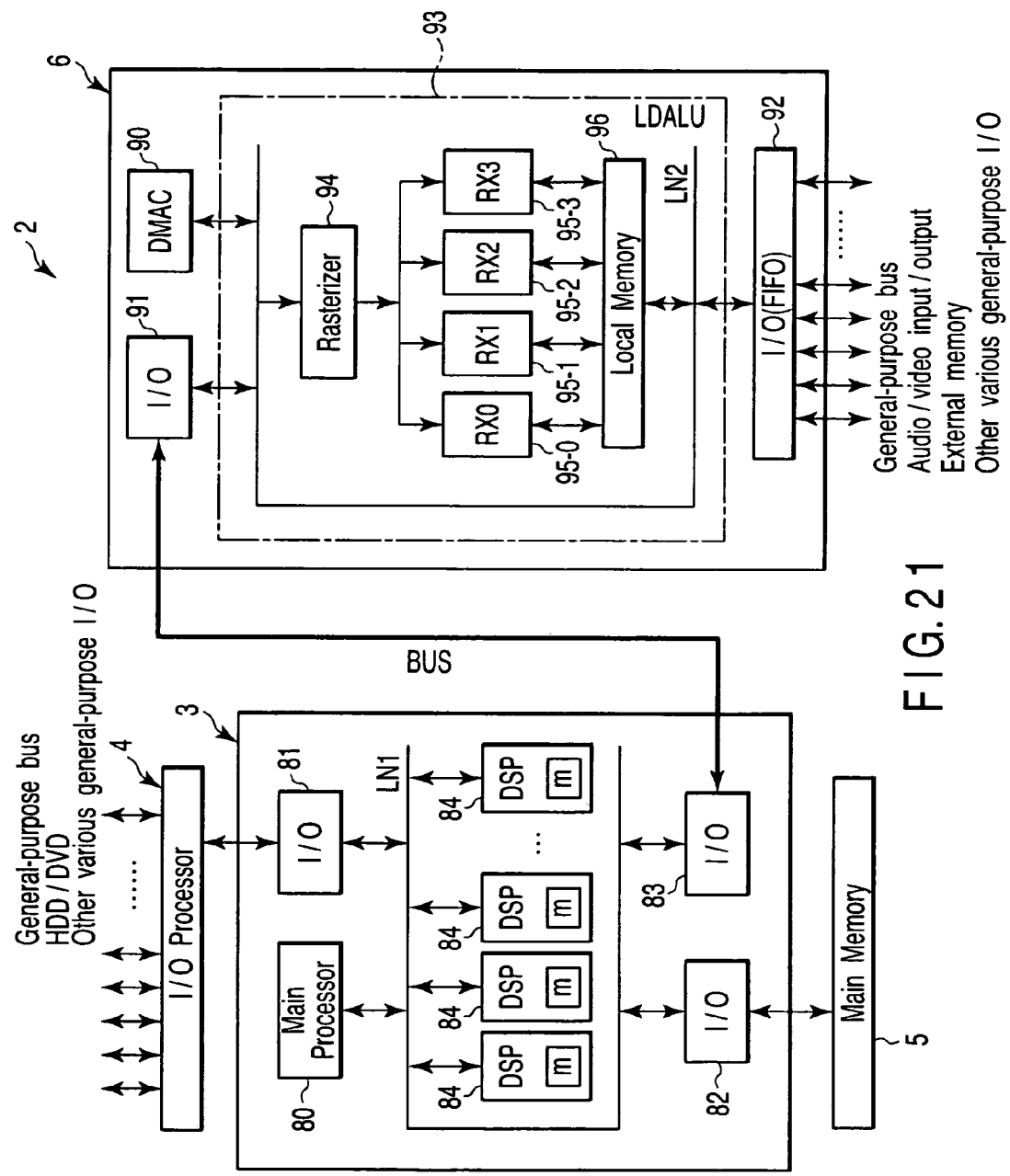
FIG. 21 is a block diagram of an image rendering processor that includes the data transfer device according to the first to fifth embodiments of the invention.

The data transfer device, semiconductor integrated circuit device and data transfer method, which have been described in connection with the above embodiments, are applicable to an image processor, for instance. FIG. 21 is a block diagram that shows an image rendering processor system LSI 2 including the data transfer device according to the above-described embodiments.

As is shown in FIG. 21, the image rendering processor system LSI 2 according to the embodiments includes a host processor 3, an I/O processor 4, a main memory 5 and a graphic processor 6. The host processor 3 and graphic processor 6 are connected over a processor bus BUS so as to be mutually communicable.

The host processor 3 includes a main processor 80, I/O sections 81 to 83, and a plurality of digital signal processors (DSPs) 84. These circuit blocks are connected over a local network LN1 so as to be mutually communicable. The main processor 80 controls the operations of the respective circuit blocks in the host processor 3. The I/O section 81 executes data transmission/reception via the I/O processor 4 between the host processor 3 and the outside. The I/O section 82 executes data transmission/reception with the main memory 5. The I/O section 83 executes data transmission/reception with the graphic processor 6 via the processor bus BUS. The digital signal processors 84 execute signal processing on the basis of data that is read out of the main memory 5 or from the outside.

The I/O processor 4 connects the host processor 3 to, for instance, a general-purpose bus, a peripheral such as an HDD or a DVD (Digital Versatile Disc) drive, and a network. In this case, the HDD or DVD drive may be mounted on the LSI 2 or may be provided outside the LSI 2.

The main memory 5 stores programs that are necessary for the operation of the host processor 3. The programs are read out, for example, from an HDD (not shown) and are loaded in the main memory 5.

The graphic processor 6 includes a DMAC 90, I/O sections 91 and 92, and an arithmetic process section 93. The DMAC 90 is the DMAC 10 described in connection with the first to fifth embodiments. The I/O section 91 controls input/output from/to the host processor 3 via the processor bus BUS. The I/O section 92 controls, for example, input/output from/to various general-purpose buses such as a PCI bus, audio/video input/output, and input/output from/to an external memory. The arithmetic process section 93 executes image processing arithmetic operations.

The arithmetic process section 93 includes a rasterizer 94, a plurality of pixel shaders 95-0 to 95-3, and a local memory (embedded DRAM) 96. In this embodiment, the number of pixel shaders 95 is four. However, the number of pixel shaders is not limited to four, and may be 8, 16, 32, etc.

The rasterizer 94 generates pixels in accordance with input graphic information. The pixel is a minimum-unit region that is handled when a given graphic is to be rendered. A graphic is rendered by a set of pixels. The generated pixels are input to the pixel shaders 95-0 to 95-3. The pixel shaders 95-0 to 95-3 execute arithmetic operations based on pixels input from the rasterizer 94, and generate image data on the local memory 96. The local memory 96 includes memory unit provided in association with the pixel shaders 95-0 to 95-3, respectively. The local memory 96 stores pixel data rendered by the pixel shaders 95-0 to 95-3. The DMAC 90, I/O sections 91 and 92, rasterizer 94 and local memory 96 are connected over a local network LN2 so as to be mutually communicable.

In the above structure, the pixel data stored in the local memory 96 are DMA-transferred to a FIFO included in the I/O section 92, and are output to the outside. The DMAC 90 controls data transfer between the local memory 96 and the FIFO of the I/O section 92 by the method described in connection with the first to fifth embodiments. Since the image rendering apparatus handles an enormous amount of data, the method of the above-described embodiments is very effective.

In the above-described embodiments, data transfer between the DRAM and FIFO has been described by way of example. Needless to say, the data transfer is not limited to this example, and the above embodiments are applicable to other cases of data transfer in which data read/write in the in-order scheme is necessary.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A data transfer device which controls data transfer between a first memory device and a second memory device, comprising: a first transfer arbiter circuit which outputs, in response to a transfer instruction for transfer of data from the first memory device to the second memory device, first transfer instructions to transfer data in a first transfer unit in an order of addresses; and a second transfer arbiter circuit which outputs, in response to the first transfer instruction, second transfer instructions to transfer the data of the first transfer unit in a second transfer unit smaller than the first transfer unit, the second transfer arbiter circuit outputting the second transfer instruction in an order of accessible addresses in the first and second memory devices;

wherein the second transfer arbiter circuit outputs an acknowledge signal after all second transfer instructions are output with respect to one of the data of the first transfer unit, and the first arbiter circuit outputs the first transfer instruction relating to a next address, in response to the acknowledge signal;

wherein the first transfer instruction includes a first address which represents a leading address of a memory area in the first memory device, where the data which is to be transferred in the first transfer unit is stored; a second address which represents a leading address of a memory area in the second memory device, where the data which is transferred in the first transfer unit is to be stored; and the first transfer unit, and the second transfer instruction includes a third address which represents a leading address of a memory area in the first memory device, where the data which is to be transferred in the second transfer unit is stored; a fourth address which represents a leading address of a memory area in the second memory device, where the data which is transferred in the second transfer unit is to be stored; and the second transfer unit; and wherein the first transfer arbiter circuit includes a third memory device which stores an address generation program and a first transfer unit table; and a processor which generates the first transfer instruction by calculating the first address, the second address and the first transfer unit on the basis of the address generation program and the first transfer unit table, the first transfer unit table stores a relationship between addresses, which are assigned to the first and second memory devices, and the first transfer units associated with the addresses assigned to the first and second memory devices, the address generation program causes the processor to add the first address and any one of the first transfer units read out of the first transfer unit table to generate a next first address, and the address generation program causes the processor to add the second address and any one of the first transfer units read out of the first transfer unit table to generate a next second address.

2. The device according to claim 1, further comprising:
a third memory device which stores the first transfer instruction,
wherein the first transfer arbiter circuit successively stores the first transfer instructions in the third memory device, regardless of a progress of a process in the second transfer arbiter circuit, and
the second transfer arbiter circuit generates the second transfer instruction on the basis of any one of the first transfer instructions stored in the third memory device.

3. The device according to claim 1, wherein at least one of the first memory device and the second memory device executes data transfer only in an in-order scheme in which the data is transferred in the first transfer unit in the order of addresses.

4. The device according to claim 1, wherein the first transfer arbiter circuit includes: a detection circuit which detects the first transfer unit on the basis of the leading address of the data in the first memory device; a first adder which adds the first address and the first transfer unit and generates a next first address; and a second adder which adds the second address and the first transfer unit and generates a next second address.

5. A semiconductor integrated circuit device comprising: a first memory device; a second memory device which receives data from the first memory device; a bus which connects the first and second memory devices and transmits the data; and a data transfer device which controls transfer of the data between the first and second memory devices via the bus, the data transfer device including: a first transfer arbiter circuit which generates, in an order of addresses, first transfer instructions each of which instructs division of data into a plurality of first division data each having a predetermined data size and instructs transfer of the first division data from the first memory device to the second memory device; and a second transfer arbiter circuit which generates, upon receiving the first transfer instruction, second transfer instructions each of which instructs division of the first division data into a plurality of second division data each having a transfer width of the bus and instructs transfer of the second division data, the second transfer arbiter circuit executing transfer of the second division data in an order of accessible areas in the first and second memory devices;

wherein the second transfer arbiter circuit outputs an acknowledge signal after completion of the transfer of all of the second division data corresponding to one of the first division data, and the first transfer arbiter circuit outputs, in response to the acknowledge signal, a next first transfer instruction;

wherein the first transfer instruction includes a first address which represents a leading address of the first division data in the first memory device; a second address which represents a leading address of the first division data, which is to be transferred, in the second memory device; and the data size, and the second transfer instruction includes a third address which represents a leading address of the second division data in the first memory device; a fourth address which represents a leading address of the second division data, which is to be transferred, in the second memory device; and a transfer width of the bus; and wherein the first transfer arbiter circuit includes a third memory device which stores an address generation program and a data size table; a processor which generates the first transfer instruction by calculating the first address, the second address and the data size on the basis of the address generation program and the data size table, and the data size table stores a relationship between addresses, which are assigned to the first and second memory devices, and the data sizes of areas associated with the addresses assigned to the first and second memory devices, the address generation program causes the processor to add the first address and any one of the data sizes read out of the data size table, and to generate a next first address, and the address generation program causes the processor to add the second address and any one of the data sizes read out of the data size table, and to generate a next second address.

6. The device according to claim 5, wherein the first memory device is a DRAM including a plurality of banks,
the second memory device is a memory which includes a plurality of entries and handles data in a FIFO scheme,
the first transfer arbiter circuit divides the data into a plurality of the first division data each having an entry width of the entry, and
the second transfer arbiter circuit preferentially transfers the second division data stored in any one of the banks in the first memory device which are accessible.

7. The device according to claim 6, wherein the first memory device has busy flags, which indicate busy/non-busy states, in association with the respective banks, and
the second transfer arbiter circuit recognizes the banks which are accessible, by checking the busy flags.

8. The device according to claim 5, further comprising:
a third memory device which stores the first transfer instruction,
wherein the first transfer arbiter circuit successively stores the first transfer instructions in the third memory device, regardless of a progress of a process in the second transfer arbiter circuit, and
the second transfer arbiter circuit generates the second transfer instruction on the basis of any one of the first transfer instructions stored in the third memory device.

9. The device according to claim 5, wherein at least one of the first memory device and the second memory device executes data transfer only in an in-order scheme in which the first division data is transferred in the order of addresses.

10. The device according to claim 5, wherein the first transfer arbiter circuit includes: a detection circuit which detects the data size on the basis of the leading address of the data in the first memory device; a first adder which adds the first address and the data size and generates a next first address; and a second adder which adds the second address and the data size and generates a next second address.

11. A data transfer method for data transfer between a first memory device and a second memory device, comprising:
outputting a first transfer instruction to transfer the data in the first memory device to the second memory device in a first transfer unit in an order of addresses;
generating, in response to the first transfer instruction, a second transfer instructions to transfer the data of the first transfer unit in a second transfer unit smaller than the first transfer unit;
outputting the second transfer instruction to the first and second memory devices in an order of accessible addresses in the first and second memory devices; and
outputting an acknowledge signal after all of the second transfer instructions are output with respect to one data of the first transfer unit, and outputting the first transfer instruction relating to a next address in response to the acknowledge signal.

12. The method according to claim 11, further comprising:
storing the first transfer instructions in a third memory,
wherein the second transfer instruction is generated on the basis of any one of the first transfer instructions stored in the third memory device.

13. The method according to claim 11, wherein at least one of the first memory device and the second memory device executes data transfer only in an in-order scheme in which the data is transferred in the first transfer unit in the order of addresses.

* * * * *